April 22, 1969     E. PRETE, JR     3,439,390
SNAPHOOK DEVICE
Filed Dec. 19, 1966
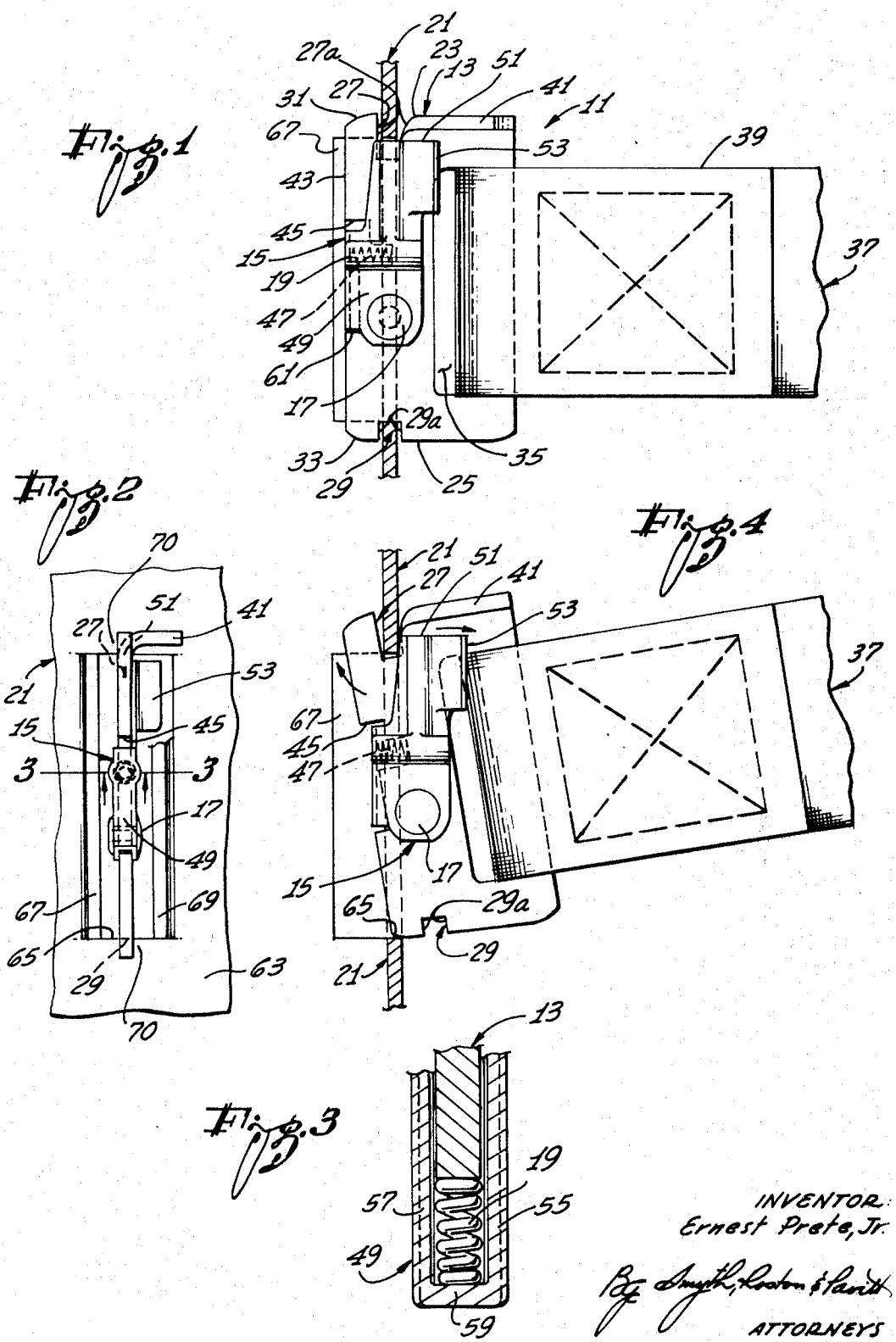
INVENTOR.
Ernest Prete, Jr.
ATTORNEYS

United States Patent Office 3,439,390
Patented Apr. 22, 1969

3,439,390
SNAPHOOK DEVICE
Ernest Prete, Jr., Woodland Hills, Calif., assignor, by mesne assignments, to Tridair Industries, Redondo Beach, Calif.
Filed Dec. 19, 1966, Ser. No. 602,871
Int. Cl. A44b 19/00, 17/00; A44c 5/18
U.S. Cl. 24—201         9 Claims

ABSTRACT OF THE DISCLOSURE

This disclosure describes a fastener of the type which is particularly adapted for securing a strap or similar member to an anchor member having an opening therein. The fastener includes a body member having generally opposed notches therein for receiving portions of the rim of the opening in the anchor member. Keeper means are movably mounted on the body member so that the keeper can be moved to a locking position in which it reduces the effective depth of at least one of the notches whereby the fastener is connected to the anchor member.

---

This invention relates to a fastener and more particularly to a snaphook device which is particularly adapted to releasably interconnect a strap to an anchor member.

Cargo which is transported by a commercial carrier is subject to various forces which tend to move the cargo with respect to the vehicle in which it is being transported. The magnitude and nature of these forces will vary with the type of vehicle used and the environment in which such vehicle is used; however, these forces exist regardless of the mode of transportation which is selected. For example, the forces acting on the cargo may be caused by acceleration and deceleration of the cargo carrying vehicle and in the case of aircraft and ship carriers, turbulence of the media through which these vehicles travel may impart substantial forces to the cargo therein.

Accordingly, it is common practice to lash the cargo securely in place so that it is substantially immovable with respect to the carrying vehicle. If the cargo were not securely held in place during the transportation thereof, it would move relative to the vehicle and create a substantial likelihood of damaging itself and the vehicle. It is desirable to use cargo securing means that are quickly and easily fastened and released. It is of the utmost importance that the cargo securing means firmly hold the cargo against severe shock loads.

Cargo is often held in place by straps or webbing which are suitably wrapped around the cargo. The ends of the straps are then affixed to the walls of the vehicle. Each strap may be provided with a buckle or other suitable means intermediate the ends thereof for varying the tension in the strap.

One of the most crucial points in the entire cargo binding system is the means to interconnect the ends of the straps to the walls of the vehicle. To accomplish this, it is common practice to permanently rigidly affix an anchor member such as a rail or track along the walls of the vehicle. The end of the strap is suitably permanently affixed to a fastener. The fastener is cooperable with the anchor member to releasably retain the strap in its cargo retaining position.

It has been suggested to utilize rails for the anchor members which are rigidly affixed to the walls of the vehicle and cooperating hook type fastener elements permanently affixed to the ends of the straps. The hooks are responsive to tensioning of the strap to interlock with the rail and hold the cargo in position. The primary difficulty with this arrangement is that the fastener is responsive only to tension in the strap, and accordingly, if this tension should be lost even temporarily due to a shifting of the load or for other reasons, the fastener may become separated from the rail and the cargo is released.

It has also been suggested to utilize a slotted track rigidly secured to the walls of the vehicle and a fastener element which is insertable therein in response to appropriate tilting of the fastener. The fastener has a pair of ears which are engageable with the rim of the slot in the track for preventing axial withdrawal of the fastener from the slot in the same direction from which it was inserted. A primary disadvantage with this construction is that the fastener can become disengaged from the slot if the fastener is inadvertently tilted to the appropriate angle. Thus, this fastening mechanism is somewhat dependent upon the maintaining of the tension in the strap. This fastening mechanism is also undesirable in that the fastener does not prevent continued movement between the track and the fastener in the same direction as it was inserted into the slot.

In an attempt to overcome the difficulties, a complex three-piece fastener was developed. This fastener includes a pair of notched outer plate members having an inner locking member sandwiched therebetween. The notches in the outer members are engageable with the rim of the slot of the anchor member and the inner member is movable to reduce the effective depth of the slot to lock the fastener in place. This device did not solve the above noted problems, however, in that it too was dependent to some degree upon the maintaining of strap tension. That is, if strap tension were reduced the locking member was subject to moving out of its locking position to thereby increase the likelihood of inadvertent withdrawal of the fastener from the slot and consequent damage to the cargo and the vehicle. Another distinct disadvantage of this mechanism is that the locking member must be manually moved to the locking position. It is, therefore, quite easy for the busy workman to not cause the locking member to complete its movement toward the locking position thereby providing a "false lock" in which event the fastener might become disconnected from the slotted track to which it had been secured. Finally, this three-piece device is relatively complex.

The present invention provides a fastener which can be quickly and easily secured to an anchor member and once so secured will not become inadvertently disengaged therefrom. The fastener of this invention moves automatically to its locked position and positively guards against false locking notwithstanding any inattention to duty on the part of the workman. The above-noted advantages are accomplished with a simple, lowcost, and easily assembled structure.

The fastener of this invention is particularly adapted for use with an anchor member that has an opening therethrough. The fastener may include a body member having first and second recesses thereon defining respectively first and second shoulders. The body member is tiltable to allow a portion thereof to be inserted through the opening to allow the shoulders of the body member to bear on a seating surface of the anchor member which is adjacent the opening therein. The fastener has a keeper that is movable between a locking position in which the effective depth of one of the recesses is reduced to thereby prevent withdrawal of the fastener from the opening and a releasing position in which the effective area of such recess is increased to allow tilting and consequent withdrawal of the fastener from the opening.

One primary feature of this invention is the provision of a spring or other means for urging the keeper toward the locking position. The spring causes the keeper to automatically assume the locking position when the fastener is in place within the opening and therefore positively precludes false locking and otherwise guards against possible thoughtlessness on the part of the workmen.

Another important feature of this invention is that the keeper is entirely independent of any load or lack of load that may be applied to the body member or to the strap which is affixed thereto. Thus, once the connection between the body member and the anchor member is established, said connection will remain regardless of the load or lack of load which is applied to the strap until the fastener is removed by a workman.

Movement of the keeper against the action of the biasing spring from the locking to the releasing position by shifting of the cargo or other unintentional activity within the transporting vehicle is very unlikely. This desirable feature is accomplished by requiring that the keeper move inwardly toward the center of the vehicle and away from the anchor member in moving from the locking to the releasing position. Accordingly, should the keeper be accidentally struck by the cargo or any other member moving thereagainst, the force of such a blow would not tend to move the keeper to the releasing position.

To further guard against inadvertent movement of the keeper and to protect the latter, it is desirable to provide a protective flange on the body member. The protective flange should extend outwardly away from the body member to a distance greater than the distance that the keeper extends outwardly from the body member.

More particularly, the body member is preferably plate-like and has a pair of notches extending inwardly from opposite peripheral edges thereof. The keeper is preferably pivotally secured to one side of the body member so that in the locking position it overlies and closes off a lower portion of one of the notches. A recess is provided in one edge of the body member for receiving the spring and the keeper preferably has a channel portion which substantially encloses the recess. The spring acts against the channel portion to bias the keeper toward the locking position.

The invention, both as to its organization and method of operation, together with further features and advantages thereof, may best be understood by reference to the following description taken in connection with the accompanying drawing, in which:

FIG. 1 is a side elevational view of a fastener connected to an anchor member and with the keeper in the locking position;

FIG. 2 is a front elevational view of the fastener with the keep in the locking position;

FIG. 3 is an enlarge fragmentary sectional view taken along line 3—3 of FIG. 2 and showing how the spring is retained between the keeper and the body member; and FIG. 4 is a view similar to FIG. 1 with the keeper being manually retained in the releasing position and with the fastener being inserted into the opening of the anchor member.

Referring to the drawing and in particular to FIGS. 1 and 2 thereof, reference numeral 11 designates a fastener or snaphook device constructed in accordance with the teachings of this invention. Generally, the fastener 11 includes a body member 13, a keeper 15 secured to the body member by a pin or rivet 17, and a spring 19 for biasing the keeper toward the locking position thereof. The fastener 11 is particularly adapted for use with an anchor member 21 which is rigidly affixed to one of the walls of a vehicle (not shown).

The body member 13 is preferably constructed of a strong metal, such as steel. The body member 13 is generally plate-like and has a pair of axially extending edges 23 and 25 in which inwardly extending generally channel shaped notches 27 and 29 extend inwardly toward each other and the notch 27 is approximately twice as deep as the notch 29. The notches 27 and 29 provide a pair of opposed shoulders 27a and 29a, respectively. The notches 27 and 29 divide the body member into a forwardly extending nose portion and a rearwardly extending portion. The nose portion has arcuate corners 31 and 33.

The rear portion of the body member 13 has an elongated slot 35 therein which receives a strap or web 37. The strap 37 is preferably permanently affixed to the body member 13 by sewing a loop 39 therein.

A protective flange 41 extends laterally from a side surface of the body member 13. In the embodiment illustrated, the flange 41 is generally perpendicular to the plane of the body member 13 and is preferably formed by bending over an upper portion of the body member. The body member 13 has a forward edge 43 which is formed with a cut-out portion 45. The cut-out portion 45 includes a spring recess 47.

The keeper 15 is pivotally secured to a central region of one side of the body member 13. The protective flange 41 extends laterally from the same side of the body member 13 a greater distance than the keeper to afford some protection to the latter. The keeper 15 is preferably formed from a metal, such as steel, and includes a channel portion 49 for substantially enclosing the recess 47, a locking edge 51, and an operating tab 53. As best seen in FIG. 3, the channel portion 49 includes side walls 55 and 57 and forward wall 59. The spring 19 acts against the body member 13 and the forward wall 59 to bias the keeper 15 in the counterclockwise direction as viewed in FIG. 1. The keeper 15 is prevented from rotating counterclockwise beyond the position shown in FIG. 1 by the engagement of a lower stop surface 61 on the keeper 15 with the lower wall of the recess 45 of the body member 13. Similarly, the engagement of the forward wall 59 with another surface of the recess 45 prevents clockwise rotation of the keeper 15 beyond the position shown in FIG. 4.

The anchor member 21 may be of various designs. One such design is illustrated in FIGS. 1, 2 and 4 and includes a track 63 having an opening 65 therein. In actual practice, the track 63 will usually be elongated and have a plurality of the openings 65 therein each of which is adapted to receive one of the fasteners 11. The opening 65 preferably has inturned flanges 67 and 69 formed integrally with the track 63. The anchor member 21 has a seating surface 70 (FIG. 2) engageable with the shoulders 27a and 29a.

The fastener 11 may be quickly and easily secured to the anchor member 21 as shown in FIG. 4. The spring 19 normally acts on the keeper 15 to maintain the latter biased forwardly to the locking position as shown in FIGS. 1–3. In this position, the locking edge 51 of the keeper 15 is operative to reduce the effective depth of the notch 27 as shown in FIG. 1. By pulling rearwardly on the operating tab 53, the keeper 15 will pivot in the clockwise direction about the rivet 17 from the locking position shown in FIG. 1 to the releasing position shown in FIG. 4. In moving to the releasing position, the forward wall 59 of the channel portion 49 moves toward the inner surface of the cut-off portion 45 to compress the spring 19. The fastener 11 is then tilted and moved so that the notch 27 receives the rim of the opening 65 in the anchoring member 21 as shown in FIG. 4. As the locking edge 51 has been moved rearwardly of the notch 27, the effective depth thereof is increased so that the full depth of the notch 27 may be utilized to receive a relatively large portion of the rim of the opening 65. The fastener 11 is then pivoted clockwise about the notch 27 until the notch 29 is immediately above a lower section of the rim of the opening 65. Of course, the body member 13 and the depth of the notches 27 and 29 are appropriately sized to allow such movement to occur. The body member 13 is then dropped slightly until the notch 29 receives a portion of the rim of the opening 65. With the fastener 11 in this position, the workman releases the operating tab 53 to allow the compressed spring 19 to urge the keeper 15 back to the locking position as shown in FIG. 1. In this position, the notch 29 rests on the lower rim of the opening 65 and the locking edge 51 of the keeper 15 lies very close to the upper section of the rim of the opening 65. The keeper acts to reduce the effective depth of the notch 27 and both notches are engageable with the opposite sides of the anchor member to lock the fastener thereto. Of course, by merely reversing the procedure described above, the fastener 11 can be disconnected from the anchor member 21.

It is apparent that with the keeper 15 in the locking position of FIG. 1, the keeper is totally independent of any forces which may be applied to the body member 13 and the anchor member 21. Should any of the cargo or any external member strike the keeper 15, it would most likely strike the keeper laterally or on the rear edge thereof and thus would not tend to move the keeper to the releasing position. Furthermore, the protective flange 41 overhangs the keeper 15, as shown in FIG. 2 so that the chances of any external member striking the keeper 15 is substantially reduced. Thus, inadvertent moving of the keeper to the releasing position or damage thereof is substantially reduced.

The spring 19 also prevents false locking of the fastener 11 in that it automatically moves the keeper 15 to the locking position. Furthermore, should the keeper 15 be moved inadvertently toward the releasing position, the spring 19 is operative to return the keeper to the locking position. The shoulders 27a and 29a formed by the notches 27 and 29 prevent any substantial relative axial movement between the keeper 15 and the anchoring member 21.

Although an illustrative embodiment of the invention has been shown and described, many changes, modifications and substitutions may be made by one having ordinary skill in the art without necessarily departing from the spirit and scope of this invention.

What is claimed is:

1. In a fastener insertable into an opening in an anchor member and connectible to a second member, the anchor member having a seating surface adjacent the opening, the combination of:
   a plate-like body member, at least a substantial portion of said body member lying in a plane, said body member having first and second recesses therein, each of said recesses defining generally opposed shoulders, said body member being movable to insert a portion of the rim of the opening a predetermined distance into said first recess to allow insertion of said body member into said opening with said shoulders lockingly engageable with the seating surface of the anchor member to prevent axial separation of the fastener and the anchor member;
   anchoring means on said substantial portion of said body member for attaching the second member to said body member independently of said keeper means, said keeper means being free of a direct connection to the second member;
   means for mounting said keeper means on said substantial portion of said body member for movement independently of the second member between a locking position to reduce the effective depth of said first recess to less than said predetermined distance to maintain said shoulders lockingly engageable with the seating surface of the anchor member and a releasing position to increase the effective depth of the recess to at least about said predetermined distance to allow separation of said body member and the anchor member; and
   means for resiliently urging said keeper means toward said locking position.

2. A combination as defined in claim 1 wherein said anchoring means includes slot means in said body member for receiving a portion of the second member.

3. A combination as defined in claim 1 including means for pivotally attaching said keeper means to said body member.

4. In a fastener for interconnecting first and second members wherein the first member has an opening therein, the combination of:
   a plate-like body member, at least a substantial portion of said body member lying in a plane, said body member having a pair of outwardly opening notches in opposite edges thereof for receiving the rim of the opening in the first member, each of said notches extending inwardly from the periphery of said body member and defining a pair of generally opposed shoulders;
   anchoring means on said substantial portion of said body member for attaching the second member to said body member;
   a keeper;
   means for pivotally mounting said keeper on said substantial portion of said body member for movement between a locking position in which said keeper overlies an inner portion of one of said notches to reduce the effective depth thereof and a releasing position in which the effective depth of said one notch is greater than the effective depth of said one notch in said locking position; and
   means for resiliently urging said keeper toward said locking position.

5. A combination as defined in claim 4 wherein said keeper is pivotally secured to said body member intermediate said notches and has insufficient length to extend completely between said notches and wherein said keeper leaves the effective depth of the other of said notches unchanged when the keeper moves between said positions thereof.

6. A combination as defined in claim 4 wherein said body member has an external surface and said keeper is mounted on said external surface, said body member having a protective flange extending outwardly from said external surface a greater distance than said keeper to protect the keeper.

7. A combination as defined in claim 4 wherein said body member has a recess in one edge thereof, said last mentioned means includes a spring positioned in said recess and said keeper includes a channel portion substantially enclosing said recess, the force of said spring being directed against said channel portion.

8. A combination as defined in claim 4 wherein said notches divide said body member into a nose portion and a rear portion, said keeper being movable toward the rear portion of said body member and away from the first member in moving to said releasing position whereby movement of said keeper is not influenced by any load applied to the members.

9. In a cargo binding assembly for use with a vehicle, the combination of:
   an anchor member rigidly securable to the vehicle, said anchor member having an elongated opening therein;
   a fastener including a plate-like body member, at least a substantial portion of said body member lying in a plane, said body member having a pair of outwardly opening notches on opposite sides thereof for receiving the rim of the opening in said anchor member, a keeper, means for pivotally mounting said keeper on said substtantial portion of said body member for movement between a locking position in which said keeper overlies an inner portion of one of said notches to reduce the effective depth thereof and a releasing position in which the effective depth of said one notch is increased and spring means for urging said keeper toward said locking position, said body member having an elongated slot therein; and a strap extending through said slot and connected to said body member, said keeper being devoid of a slot for receiving said strap whereby said strap is connected to said body member independently of said keeper and said keeper is free of a direct connection to said strap.

References Cited

UNITED STATES PATENTS

| | | |
|---|---|---|
| 2,984,885 | 5/1961 | Elsner. |
| 3,178,790 | 4/1965 | Cech. |
| 3,323,186 | 6/1967 | Rennert. |
| 3,332,123 | 7/1967 | Higuchi. |

FOREIGN PATENTS

| | | |
|---|---|---|
| 937,816 | 9/1963 | Great Britain. |

BERNARD A. GELAK, *Primary Examiner.*

U.S. Cl. X.R.

24—265